3,565,933
COPPER GLUCONATE-GLYCINE COMPLEX
Harold N. Vagenius, 1634 Elmwood Ave.,
Berwyn, Ill. 60402
No Drawing. Filed May 13, 1968, Ser. No. 728,817
Int. Cl. A61k 7/16; C07f 1/08
U.S. Cl. 260—438.1
2 Claims

ABSTRACT OF THE DISCLOSURE

The present invention is an oral deodorant comprising a water soluble reaction product of copper gluconate and glycine.

This invention relates to compounds including copper together with gluconate and glycine radicals. The invention also pertain to deodorizing, enzyme inhibition and bactericidal action effected by the use of the said compounds.

Copper compounds are known which include gluconate and aminobenzoic acid radicals. See U.S. Pat. No. 2,762,822. These compounds are excellent deodorants. However, there compounds are not soluble in water at approximately neutral pH values. Further the compounds of said patent are strongly absorbed by various proteins and other materials.

Copper gluconate has also been used as a deodorant. See U.S. Pat. Nos. 2,894,876 and 3,044,939. However, as will be shown below, copper gluconate tends to be absorbed by mucin (the principal protein present in saliva and in dental plaques) which is undesirable in oral deodorants.

The compounds of the present invention are soluble in water at least within the pH range 4.5 to 8.0. Further, These compounds are not absorbed by mucin and by solid saliva constituents to nearly the same extent as copper gluconate. These compounds are excellent deodorants, and their deodorizing effect does not tend to be localized due to adsorption but can be depended upon to be effective throughout the oral cavity.

The actual formation of a copper gluconate-glycine complex is demonstrated as follows.

EXAMPLE 1

An 0.1 aqueous molar solution of copper gluconate was prepared and its pH was adjusted to 7.0 with sodium hydroxide. An 0.1 aqueous molar solution of glycine was prepared and its pH was also adjusted to 7.0 with sodium hydroxide. The two solutions were mixed. The pH of the resultant mixed solution was found to be 5.23.

EXAMPLE 2

An 0.1 aqueous molar solution of copper sulfate was prepared, and an 0.2 molar aqueous solution of sodium gluconate was added thereto. The pH of the mixed solution was adjusted to 7.0 with sodium hydroxide. An 0.1 molar aqueous solution of glycine was prepared and its pH was adjusted to 7.0 with sodium hydroxide. It was then added to the previously prepared mixed solution. The pH of the final soultion was 5.45.

Thus, as shown in Examples 1 and 2, mixing solutions of copper gluconate with sodium glycinate resulted in the production of a new complex as evidenced by the liberation of hydrogen ions. This complex is negatively charged, which would explain why it is not adsorbed by the dental plaque, which also is negatively charged.

EXAMPLE 3

The following aqueous solutions were made up:

Solution #5
    0.1 molar copper sulfate
    0.2 molar sodium gluconate
Solution #6
    0.1 molar glycine
Solution #7
    A mixture of equal parts of solutions #5 and 6.
Soultion #8
    0.1 molar copper sulfate
    0.1 molar glycine The pH of each solution was adjusted to 7.0 with sodium hydroxide. The spectral absorption of each solution was determined on a Coleman Jr. Spectrophotometer in the range from 400 to 700 millimicrons and plotted on graph paper. Each solution gave a distinct and characteristic curve. For instance, at wave lengths 400 and 670 the following absorptions were noted; as shown in the following Table 1.

TABLE 1.—ABSORPTION

| Solution Number: | 400 | 670 |
|---|---|---|
| 5 | 22 | 28 |
| 6 | 0 | 0 |
| 7 | 9 | 17 |
| 8 | 6 | 16 |

EXAMPLE 4

The following solutions wer made up and adjusted to pH 7.0 with sodium hydroxide:

Solution #1
    0.1 molar copper sulfate
    0.1 molar glycine
Solution #2
    0.1 molar copper gluconate
    0.1 molar glycine The two solutions were put in the two cuvettes of a Perkin-Elmer-Hitach double beam recording spectrophotometer and the relative absorption recorded in the spectral range from 250 to 800 millimicrons. Deviation of the lines obtained from the two solutions was found, for instance, to be plus 46% at 300 millimicrons and minus 13% at 517 millimicrons, showing clearly the existence of two different complexes. It is clear that the addition of glycine to a copper gluconate solution does not simply effect the exchange of a glycine radical for gluconate radical.

EXAMPLE 5

Human saliva obtained from 10 donors (by chewing paraffin) was thoroughly mixed. Aliquots of 10 ml. each were put into centrifuge tubes and spun at 3000 r.p.m. for 5 minutes. The clear supernatant saliva was discarded, care being taken not to disturb the sediment. Four different aqueous solutions were made up, respectively, of 0.1 molar copper sulfate, 0.2 molar sodium gluconate, 0.1 molar glycine, and 0.1 molar copper gluconate, and each solution was adjusted to a pH of 7.0 with sodium hydroxide. 5 ml. volumes of these solutions, and 5 ml. or 10 ml. volumes of water, as indicated in Table 2 below, were added to centrifuge tubes containing salivary sediment. Similar volumes of solutions were also mixed without sediment, to serve as controls. The contents of the tubes containing the sediment were thoroughly mixed, to disperse the mucin debris. After the tubes had been allowed to stand at room temperature for 10 minutes, the tubes were again spun in the centrifuge. The color density of each tube (and the corresponding control) was measured with a Coleman spectrophotometer at a wave length of 475. The results are given in Table 3 below.

TABLE 2

| Solution Number: | CuSO₄ | Na gluco-nate | Glycine | Cu gluco-nate | H₂O |
|---|---|---|---|---|---|
| 11 | 5 | 0 | 0 | 0 | 10 |
| 12 | 5 | 5 | 0 | 0 | 5 |
| 13 | 5 | 0 | 5 | 0 | 5 |
| 14 | 5 | 5 | 5 | 0 | 0 |
| 15 | 0 | 0 | 0 | 5 | 10 |
| 16 | 0 | 0 | 5 | 5 | 5 |

TABLE 3

| | Optical densities | | |
|---|---|---|---|
| Solution Number: | Control | With sediment | Difference |
| 11 | 0.720 | 0.625 | 0.095 |
| 12 | 0.600 | 0.470 | 0.130 |
| 13 | 0.515 | 0.425 | 0.090 |
| 14 | 0.510 | 0.415 | 0.095 |
| 15 | 0.675 | 0.535 | 0.140 |
| 16 | 0.580 | 0.500 | 0.080 |

As shown, adding gluconate radicals to copper ions (making a copper gluconate complex) increases the amount of copper absorbed by the mucin debris (as evidenced by decrease in optical densities of the supernatant). This finding is confirmed by the high absorption shown by copper gluconate. Adding glycine to copper gluconate greatly decreases absorption.

EXAMPLE 6

A 2% aqueous mixture of commercial powdered casein was prepared and allowed to equilibrate in the refrigerator overnight. Ten ml. portions of the resulting suspension were put into centrifuge tubes and spun at 3000 r.p.m. for 5 minutes. The clear supernatant liquid was discarded. Solutions identical with solutions Nos. 15 and 16 in Example 5 were prepared, mixed with the casein sediment and water (as indicateed in Table 2) and again centrifuged. The optical densities of the supernatant liquid at a wavelength of 475 were determined and compared with the controls (solutions Nos. 15 and 16 before the latter were mixed with the centrifuged casein). The results are tabulated as follows:

TABLE 4

| | Optical densities | | |
|---|---|---|---|
| Solution | Before casein | After casein | Difference |
| Number: | | | |
| 15 | 0.675 | 0.591 | 0.084 |
| 16 | 0.580 | 0.554 | 0.026 |

These data show clearly that adding glycine to copper gluconate reduces the absorption by casein.

EXAMPLE 7

A mixture of 472 mg. of copper gluconate and 75 mg. glycine (1:1 molar) was dissolved in water and so diluted that 25 ml. contained 0.1 mg. of copper gluconate. A similar solution was also made up that contained additionally 1.0 mg. ferrous gluconate per 25 ml. solution. These two solutions are identified as solutions Nos. 20 and 21, respectively.

Oral odors were induced in human subjects by a standard procedure described as follows. Frozen concentrated grapefruit juice was reconstituted according to the manufacturer's directions. 25 ml. of this reconstituted juice was swished around in the mouth and swallowed. 10 ml. of whole milk were swished around in the mouth and also swallowed. Ten minutes were allowed to elapse. The odor intensity in the mouth of each subject was determined as follows. An air stream was passed through Norite charcoal, then through water at 40 degrees centigrade and then through a tube into the subject's mouth (while the subject breathed through the nose), allowed to wash the subject's mouth and passed out through another tube (both tubes passing through a rubber stopper held by the subject's lips and closing his mouth) into a large size "Baggies" plastic bag of standard size. The odor level of the air sample in the plastic bag was determined with a standard osmoscope. Immediately after the first air sample was taken the subject was given 25 ml. of deodorant solution which was vigorously swished around the mouth for 1 minute and then expectorated. Another sample of mouth air was immediately collected in the manner described and its odor level determined. The odor levels are shown in the following table.

TABLE 5

| | Solution 20, odor level | | Solution 21, odor level | |
|---|---|---|---|---|
| | Before | After deodorant | Before | After deodorant |
| Subject: | | | | |
| 1 | 6 | 2 | 6 | 2 |
| 2 | 6 | 3 | 6 | 1 |
| 3 | 6 | 2 | 6 | 1 |
| 4 | 6 | 3 | 6 | 1 |
| 5 | 6 | 2 | 6 | 2 |
| Average | 6 | 2.4 | 6 | 1.4 |

The highest odor level is indicated by the numeral 6. It is a measure of the dilution with fresh air at which odor is barely detectable. The lower numbers represent correspondingly lower odor levels. Many tests have shown that an odor level of 3 is just socially acceptable.

The above data show that a copper gluconate-glycine complex is an effective oral deodorant and that the addition of ferrous gluconate enhances its effectiveness.

Actually, as I have found, my copper gluconate-glycine complex is effective as an oral deodorant in doses as small as 0.05 mg. and in doses one half that size in the presence of 5 to 15 parts (per part of complex, by weight) of ferrous gluconate. The preferred dosage is 0.1 to 1 mg. (in the absence of ferrous gluconate) and 0.05 to 0.5 mg. (in the presence of about 10 parts ferrous gluconate).

The deodorants of my invention may be included in mouth washes, dentifrices and solid confectionary in concentrations ranging from 0.1 or less to 1 part (of copper gluconate, by weight) per million. Such confectionary may be candy tablets or a masticatory gum. For this purpose, the solution of the above examples may be used in preparing mouth washes, dentrifrices or confectionary materials, or such solutions may be evaporated to dryness and the product then used by admixture with other ingredients of the product to be prepared.

The product of this invention may also be prepared by mixing solutions of 1 mole of copper glycinate and 2 moles of sodium gluconate. Many other details may be varied without departing from the principles of this invention, which are set forth in the appended claims.

I claim:
1. A deodorant copper gluconate-glycine complex soluble in water at least within the pH range 4.5 to 8.
2. An aqueous solution of the composition of claim 1.

References Cited

UNITED STATES PATENTS 2,762,822 9/1956 Vagenius.
2,894,876 7/1959 Scanlan.
3,044,939 7/1962 Scanlan.

TOBIAS E. LEVOW, Primary Examiner

H. M. S. SNEED, Assistant Examiner

U.S. Cl. X.R.

424—54